Oct. 22, 1957  G. BILLI  2,810,277
CIRCULAR MACHINERY FOR MANUFACTURE OF SMOOTH
MESH AND NET MESH STOCKINGS
Filed June 30, 1954  8 Sheets-Sheet 1

INVENTOR:
GIORGIO BILLI

By
Richardson, David and Nordon
ATTYS

Oct. 22, 1957  G. BILLI  2,810,277
CIRCULAR MACHINERY FOR MANUFACTURE OF SMOOTH
MESH AND NET MESH STOCKINGS
Filed June 30, 1954  8 Sheets-Sheet 2
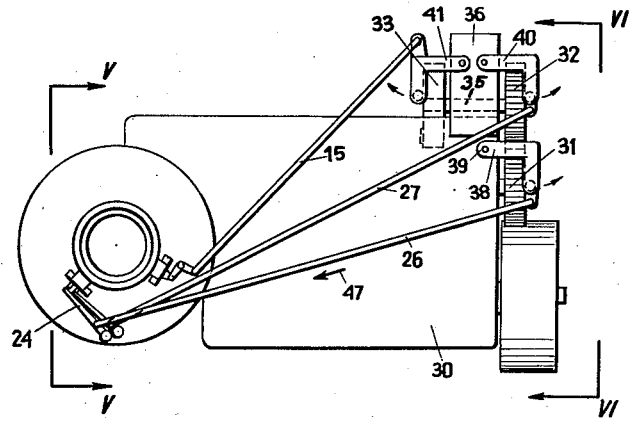
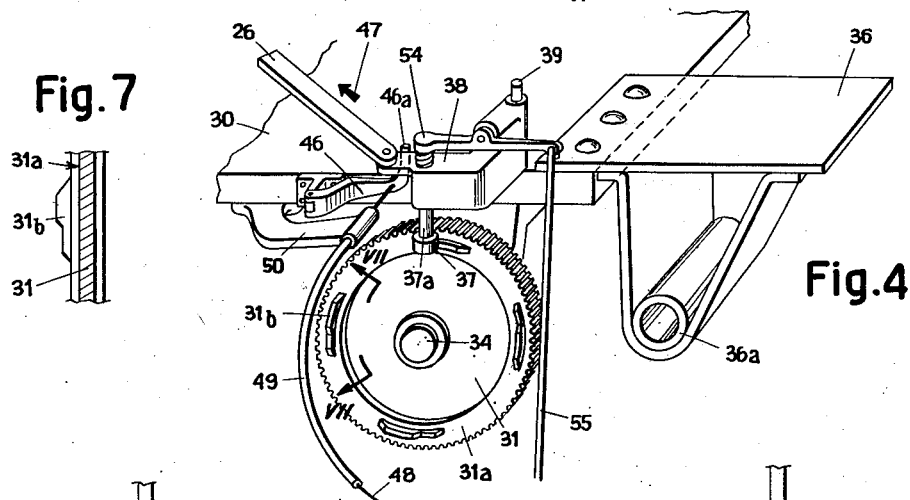
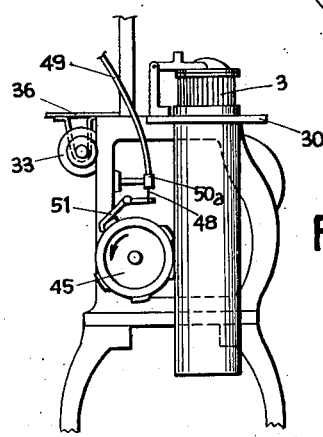
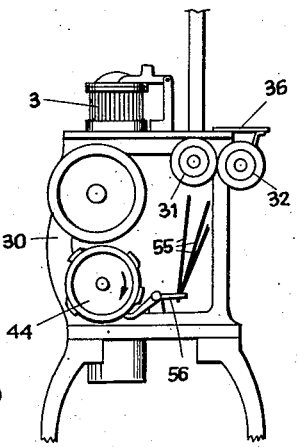
INVENTOR:
GIORGIO BILLI
by
Richardson, David and Nordon
Atty's Fig.10  Fig.10a  Fig.11  Fig.11a
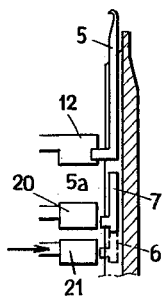 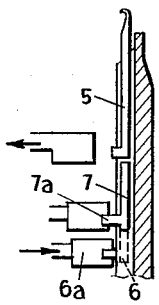 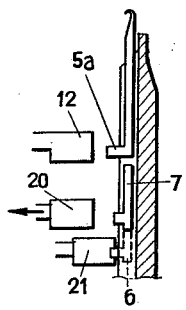 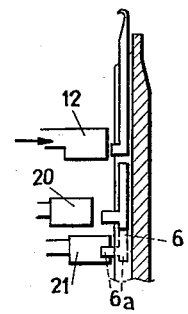
Fig.12  Fig.12a  Fig.13  Fig.13a
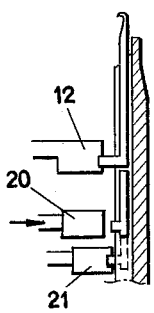 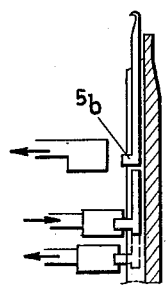 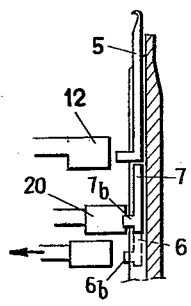 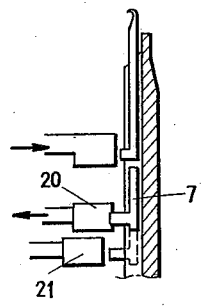

INVENTOR:
GIORGIO BILLI

Oct. 22, 1957 — G. BILLI — 2,810,277
CIRCULAR MACHINERY FOR MANUFACTURE OF SMOOTH MESH AND NET MESH STOCKINGS
Filed June 30, 1954 — 8 Sheets-Sheet 8

Giorgio Billi
INVENTOR
By Richardson, Davidow Nordon
his ATTYS.

United States Patent Office 2,810,277
Patented Oct. 22, 1957

2,810,277

CIRCULAR MACHINERY FOR MANUFACTURE OF SMOOTH MESH AND NET MESH STOCKINGS

Giorgio Billi, Fucecchio, Florence, Italy

Application June 30, 1954, Serial No. 440,492

Claims priority, application Italy November 10, 1953

14 Claims. (Cl. 66—50)

It is known that there are circular hosiery machines for the manufacture of tubular elements and in particular of stockings, especially for ladies. Older machines of this type (such as those produced by Scott & William U. S. A.) are actuated in order to form the so-called smooth mesh, that is, with the needles which always discharge the mesh.

Other machines of more recent make are capable of obtaining, among other things, also the so-called net mesh, actuated through particular controls of the needles so that said needles do not always discharge the mesh. The machines of the latter type are very complex and expensive, while, on the other hand, it is presently and often desirable to make stockings with the so-called net mesh.

The invention relates to improvements in the machines belonging to the first mentioned type, through which it is possible that a circular machine only actuated for the smooth mesh work may also be adapted at pleasure for the actuation of a mesh having substantially the appearance of the net mesh.

The improved machines according to the invention substantially include in correspondence of all the needles and underlying said needles, the same number of pushers or sub-needles or jacks, and a plurality such as a set of three additional cams designed to act, one of said cams on the feet of the needles and the others on the feet of the pushers or jacks arranged respectively on corresponding alignments; said cams can be promptly inserted, through automatic controls, so as to act in one position on the feet of all the needles or respectively of all the corresponding pushers or jacks, in a second slightly set back arrangement designed to act only on the high feet and not on the low feet of the needles or of the corresponding jacks, and in a third position of exclusion in order not to affect any needles and jacks.

An essential feature of the improvements in question is that along the circumference, where the needles lie, there is an arc, such as a semi-circumference, wherein the needles are provided with a high foot and a complementary arc, such as a second semi-circumference, wherein the needles are provided with a low foot, while in correspondence of the high foot needles, the jacks are provided with a low foot and in correspondence of the low foot needles the jacks are provided with a high foot.

An appropriate automatic distribution or timing, by means of cams provided with suitable shaped profiles, determines the automatic displacements of the three abovementioned cams, when the machine, instead of operating for the forming of the smooth mesh, is required to be pre-set for the forming of the net mesh. In this case, through the provision of three cams, said three cams are set in operation and the usual so-called closure or stitch cam, which usually serves to eject the mesh out of the needles, is excluded. In order to form the net mesh according to the present improvements, a revolution is alternatively provided and in said revolution all the needles are totally raised so that they may effect the so-called discharge of the thread or mesh, then there is a revolution wherein only one needle of each pair is completely raised so as to discharge the thread, while the other one remains inoperative, then a third revolution wherein all the needles are discharged again and a fourth revolution wherein the needles are alternatively discharged again, discharging the needles which previously had not been operated. In the case wherein the cams, which act on the jacks, are more than two and the pushers feet are arranged on more than two alignments, in a revolution during which only a section of the needles are discharged, it is possible to provide for the unloading of one needle of every three of them or two needles for every three of them or similarly. It is also possible to provide for more than a revolution, wherein only a section of the needles are discharged, between two revolutions wherein all the needles are discharged. It is also possible to provide for a discharge of two needles and no discharge of two or more needles during a revolution, by arranging two or more adjacent pushers or jacks on a same alignment and the two or more following needles on another alignment and so on.

Other arrangements and operational details of the improvements in accordance with the invention will be better appreciated in the following description, which together with the drawings illustrates a diagrammatic embodiment.

In the drawing:

Fig. 3 illustrates a diagrammatic top view of the additional cams control members;

Fig. 4 illustrates a perspective detail view of the control of one of said cams;

Figs. 5 and 6 illustrate diagrammatic views along the lines V—V and VI—VI of Fig. 3 respectively;

Fig. 7 illustrates a detail of the circular drive cam of the additional cams according to a section along the line VII—VII of Fig. 4;

Figure 8:
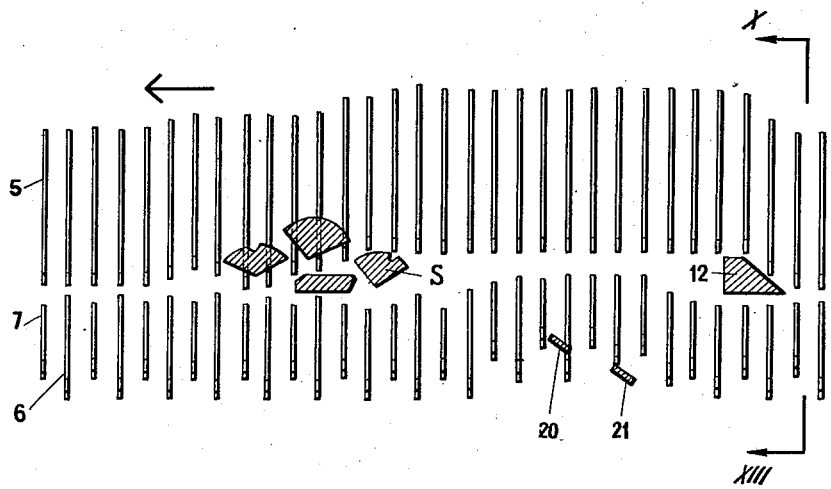
Fig. 8 illustrates a control diagram of the needles.
Figure 9:
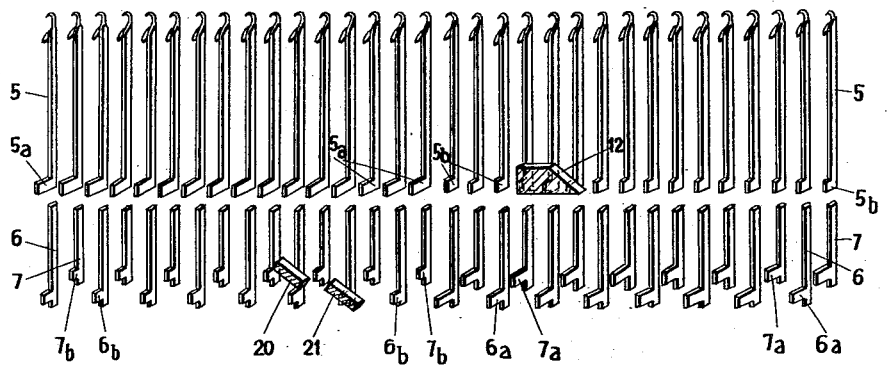
Fig. 9 illustrates a perspective diagram of the needles and the relative jacks.

Figs. 10, 10a, 11, 11a, 12, 12a, 13, 13a, illustrate diagrammatic sections along the line X—XIII of Fig. 8; Figs. 10 and 10a illustrating the position of the additional cams during the first and the second half turn of the first revolution or phase respectively; Figs. 11 and 11a the position of said cams during the first and the second half turn of the second revolution respectively; Figs. 12 and 12a illustrating the position of the cams during the first and the second half turn of the third revolution respectively; Figs. 13 and 13a illustrating the position of the cams during the first and the second half turn of the fourth revolution respectively of a complete cycle.

Figure 14:
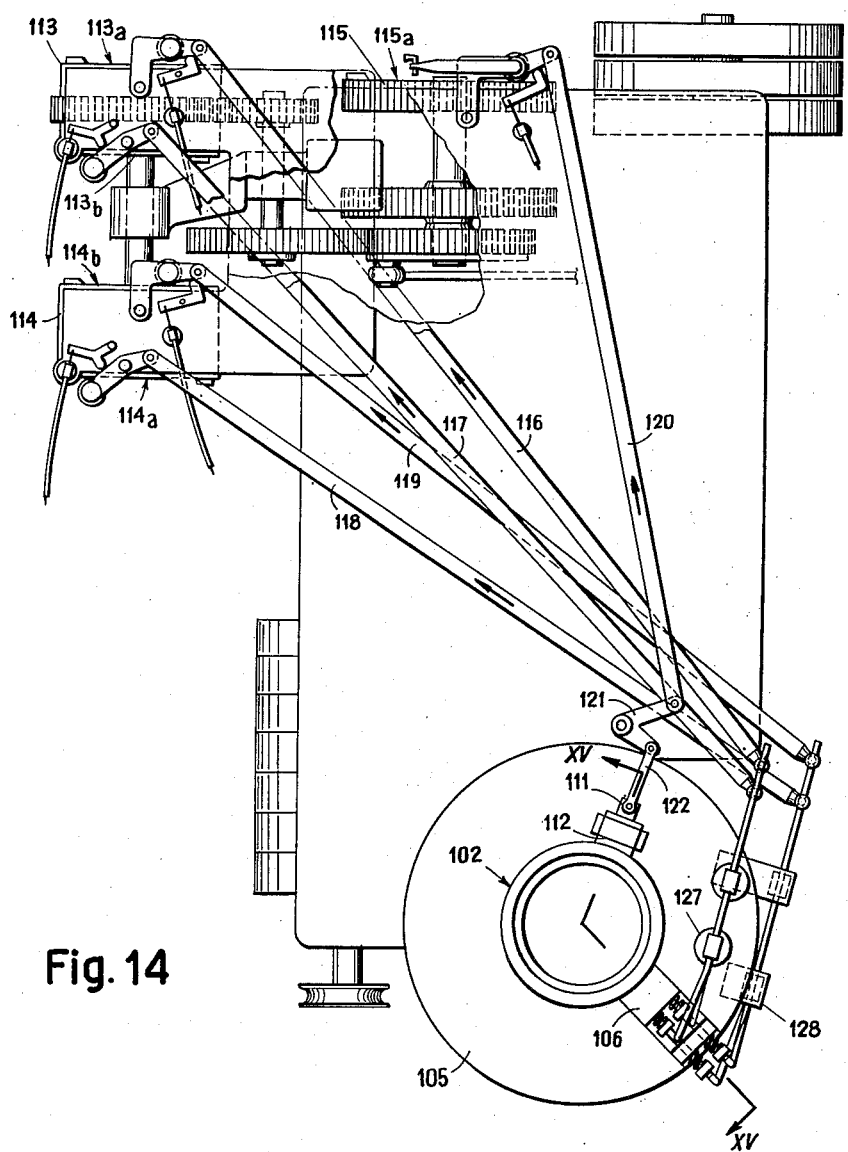
Figure 15:
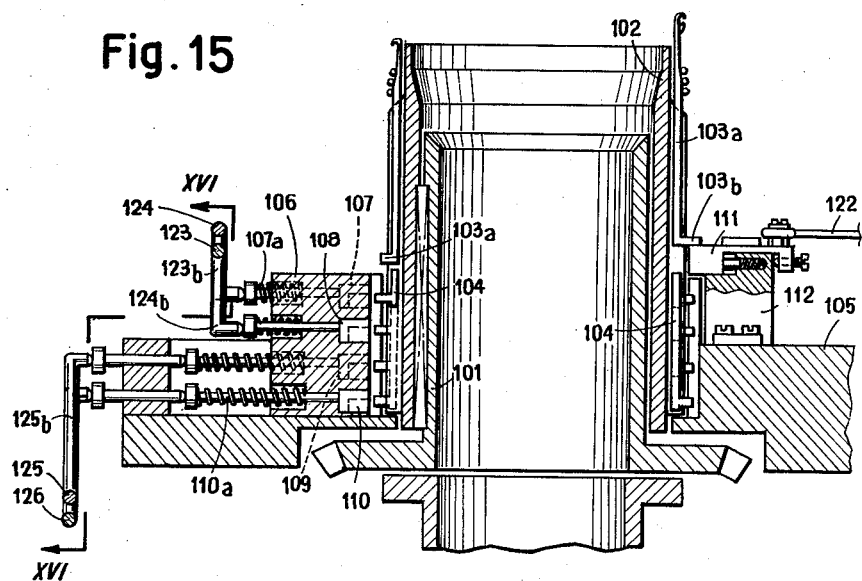
Figure 16:
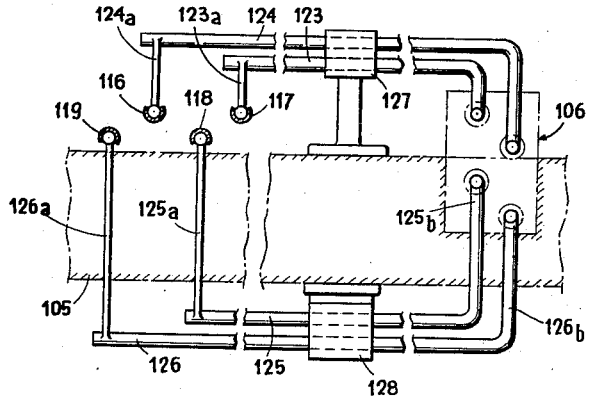
Figure 17:
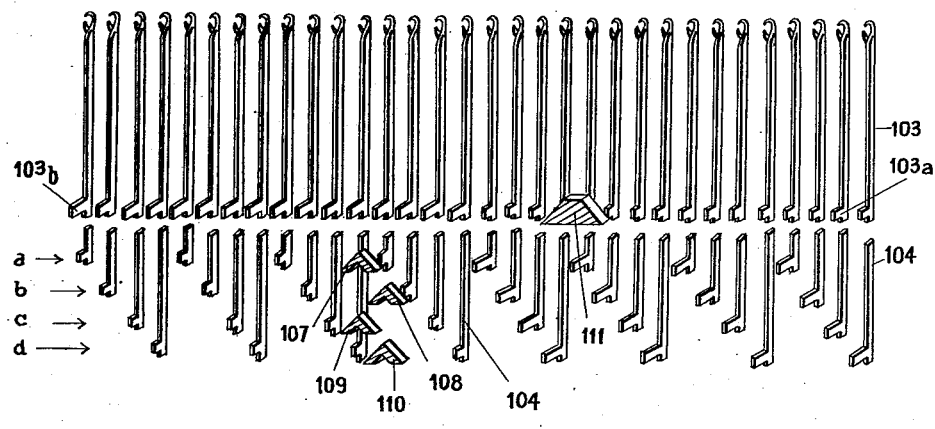
Figure 18:
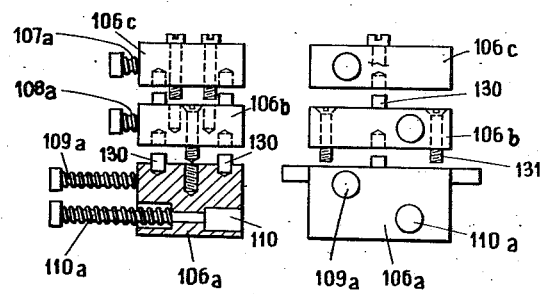

Fig. 14 illustrates a diagrammatic plan view of the control members and of the cams according to a structurally modified form;

Fig. 15 illustrates, on an enlarged scale, a diametrical section along the broken line XV—XV of Fig. 14;

Fig. 16 illustrates a diagrammatic section along the line XVI—XVI of Fig. 15;

Fig. 17 illustrates a perspective diagram of the needles and the relative jacks;

Fig. 18 illustrates two views and a section of an execution of the block carrying the jacks control cams;

Figs. 19, 20, 21 and 22 illustrate views, similar to Fig. 17, of modified arrangements of needles and relative jacks for controlling different numbers of jack feet alignments.

Figure 2:
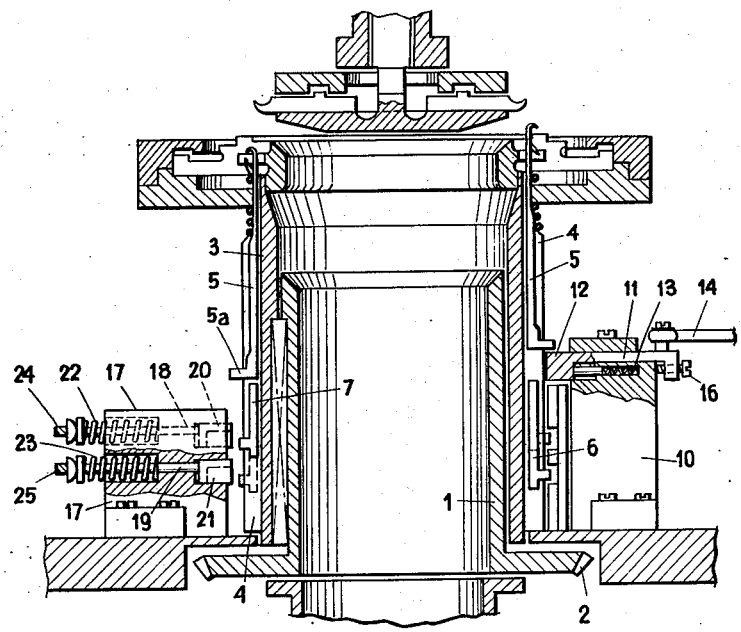
Fig. 2 illustrates a vertical section along the broken line II—II of Fig. 1.
Figure 1:
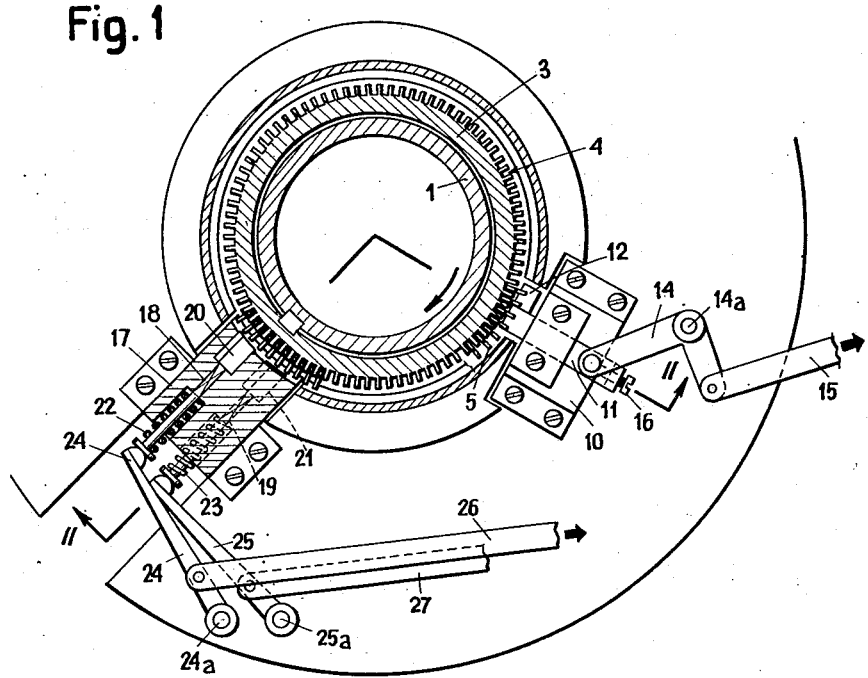
Fig. 1 illustrates a diagrammatic horizontal section of the rotating work cylinder and the devices thereto connected for the control of the needles.

In accordance with Figs. 1 to 13, numeral 1 denotes the rotating drum driven by the bevel gear 2 and coupled to the cylinder 3. The grooves 4 are externally and longitudinally cut in said cylinder 3 and are only partly drawn in Fig. 1 and are developed along the entire circumference of the cylinder 3. The needles 5 are slidably housed in the grooves 4 in a known manner. The alternatively long and short pushers or jacks 6 and 7 are arranged in the grooves 4 under the needles and in all the grooves, and each jack is provided with a foot. The arrangement of said jacks 6 and 7 is such whereby their feet are arranged on two rows, that is, on two superimposed circumferences and exactly the feet of the long jacks 6 are arranged according to a lower circumference or alignment and the feet of the short jacks 7 are arranged along an upper circumference or alignment; the actuation must be however effected in such a way that, of said jacks—whichever their length may be—alternately one presents its foot along the lower circumference or alignment and the other along the upper circumference or alignment. As an alternation, there may be a group of two or more successive jacks with their feet arranged along an alignment and an adjacent group of successive jacks with their feet arranged on the other alignment.

The needles 5 also present a foot which is arranged along a sole circumference or alignment; the needles 5 contained along an arc, for example, along a semi-circumference, are provided with high feet 5a, while the needles 5 arranged along the complementary arc, for example, along the other semi-circumference, are provided with short or low feet 5b.

The feet of the jacks 6 and 7 corresponding to the high foot needles are provided with a short or low foot and are respectively indicated by 6b and 7b, while the jacks 6 and 7 arranged under the needles 5 provided with a low foot 5b, are provided on the contrary with a high foot, respectively indicated by 6a and 7a. Therefore, along an arc such as a semi-circumference, the feet of the needles are high and the feet of the jacks are low, while instead in the other arc or semi-circumference the feet of the needles are low and the jacks feet are high.

The machine is provided with the known usual cams for the usual working; of said usual cams, only the so-called closure or stitch cams (Fig. 8) is to be actuated or transformed so as to be retracted in order not to affect the needles when the unit relative to the present improvement is operated so as to obtain the net mesh.

The so-called additional cams are laterally located with respect to the cylinder. A base more particularly indicated by 10 houses a slide 11 carrying the auxiliary cam 12 capable of acting on the feet 5a—5b of the needles; said cam is stressed according to a direction by a counter spring 13 and by a square lever 14 pivoted on a stationary pin 14a and controlled by a rod 15, in the opposite direction; a screw 16 forms an adjustable stop for the adjustable positioning of the cam 12. This cam is capable of raising by means of its inclined profile, the feet 5a and eventually also those denoted by 5b, so as to raise the needles to such an extent that the mesh may be discharged.

In an angular position appropriately spaced relative to the angular position of the cam 12, for example, in the range of 100° to 120°, there is another block 17 which carries a number of cams equal to the number of alignments of the feet forming the jacks; in the embodiment, said cams are two and therefore in the block 17 there are two slidably guided rods 18 and 19 which inwardly carry two cams 20 and 21 respectively, formed by sloped planes capable of controlling the feet 7a and 7b of the upper circumference or alignment of the jacks 7 respectively and the feet 6a—6b of the lower circumference or alignment of the jacks 6 respectively. The two cams 20—21 with their relative rods 18 and 19 are controlled in one direction by two springs 22 and 23 respectively and in the opposite direction by two levers 24 and 25 respectively pivoted at 24a and 25a respectively; said levers 24 and 25 are controlled by two rods 26—27.

A cycle formed by four revolutions or phases, each revolution divided in two half turns or in two arcs whose sum is equal to a complete revolution, is effected by the machine so as to obtain the so-called net mesh through the improved device and the illustrated arrangement and combinations.

A first revolution actuates the discharge by all the needles. During the first half turn (Fig. 10) the cam 12 is inserted for a half and operates the lifting of the needles 5 having a high foot 5a, acting on said feet; the cam 20 is inserted for a half but does not act on the short jacks 7 because they are provided with short feet in correspondence of the high feet 5a; the cam 21 in this first half turn advances as far as to graze the low feet of the long jacks 6. During the second half turn (Fig. 10a) the cam 12 does not act on the needles 5 because they are provided with a low foot 5b and during this half turn, said cam withdraws; on the contrary, the cam 20 lifts the jacks 7 which are provided with high feet 7a and similarly the cam 21 lifts the jacks 6 provided with high feet 6a; said cam 21 also completely advances during this half turn. During this first revolution or phase therefore all the needles 5 either directly or through the jacks are lifted in order to discharge the mesh.

The second revolution effects the partial lifting of a section of the needles and exactly of the needles which correspond to the long jacks 6, i. e. those having the foot on the lower alignment. During the first half turn (see Fig. 11) only the jacks 6 act and are lifted by the cam 21, acting on the low feet 6b of said jacks; the cam 12 remains completely set back, while the cam 20 is pushed back completely from the intermediate position and does not act on the low feet 7a of the jacks 7. During the second half turn (see Fig. 11a) the cam 21 carries on the lifting of the needles, now operating on the high feet 6a of the jacks 6; the cam 20 is kept inactive and the cam 12 also remains inactive but advances up to the half travel, that is, to half of its insertion. During said second revolution therefore only one needle out of two is lifted and that is only those corresponding to the jacks 6 which are raised; the thread is only discharged from the alternate raised needles and thus a revolution or turn of the net mesh is formed.

The third revolution effects the discharge by all the needles again. During the first half turn (see Fig. 12) the cam 12, previously inserted for a half, lifts all the needles which are provided with high feet; the cam 20, from the set back position, advances up to the middle slightly grazing the low feet of the short jacks, but remains inactive; the cam 21 is completely inserted and also lifts the long jacks having short feet, which follow the motion imparted directly to the needles by the cam 12. During the second half turn (see Fig. 12a) the two cams 20 and 21 act on the high feet of all the jacks raising all the needles; during this stage, the cam 20 completely advances, the cam 21 is retracted for a half and the cam 12 is completely retracted. Therefore all the needles are raised for the discharge during said third revolution.

The fourth revolution actuates the discharge, that is, the alternate lifting of the needles and exactly the lifting and discharge of the needles corresponding to the short jacks. During the first half turn (see Fig. 13) only the cam 20 acts on the low feet of the short jacks 7; the cam 21 does not act on the feet 6a—6b of the jacks 6 and it is completely moved back; the cam 12 remains set back and is inactive. During the second half turn, the cam 20 continues to lift the jacks 7 by acting on the high feet 7a and is also moved back so as to remain inserted for a half; the cam 21, which is retracted, does not act on the high feet of the long jacks; the cam 12 advances up to the half way but does not act on the low feet of the needles. Therefore during the fourth revolution, only one needle out of two is lifted and exactly those corresponding to the short jacks 7 which had not been lifted during the second revolution or phase.

When completed the cycle, the first half turn (see Fig. 10) of the first revolution or phase is re-assumed, and during this revolution only the motion of the cam 21, which advances up to its half insertion, occurs.

The control of the various motions, which are to be imparted to the cams 12, 20 and 21 are obtained in a suitable way, for example by cams rotating at a speed equal to ¼ of the speed of the cylinder 3, carrying the needles in such a way that for each complete revolution of a circular control cam the desired motions of rods 15—26—27 are obtained, each revolution of the needles cylinder 3 corresponding to ¼ of circumference of the relative circular control cam. For this purpose a set of three front circular cams 31—32—33 is mounted on the structure 30; the first cam is mounted on a shaft 34 for example, and the other two are mounted on a common shaft 35 carried by an appropriate housing or bushing 36a of a stirrup 36, held by the structure 30. Said disc or circular cams 31—32—33 have an appropriate speed, for example equal to ¼ of the speed of the needles cylinder 3. The disc cam 31 has a front circular profile 31a with suitable projections, of which only 31b is drawn; a small roller or wheel 37 carried by a lever 38 angularly and movably mounted on a stationary pin 39, is located in correspondence of the profile 31a—31b; the end of the rod 26 is engaged to the lever 38; in this way, the displacements imparted by the profile 31a, provided with the projections 31b, to the roller 37 and thus to the square lever 38 also determine correspondent displacements of the rod 26 which, through the lever 24, impose the position of total insertion and partial insertion and inactivity to the cam 20; the whole is effected with the desired promptness by means of the shaping of the profile 31a—31b.

The rod 27 is connected to a lever 40 similar to the one denoted by 38 and the rod 15 is connected to a lever 41, also similar to the one denoted by 38; the two levers 40 and 41 are controlled by small wheels (not shown in the drawing) similar to the one denoted by 37 and which are located in correspondence of the shaped profiles of the two circular cams 32 and 33 respectively. The rotation of said circular cams 31—32—33 allows to actuate the successive cycles of all the additional cams 12—20—21 and these cycles have the duration of four revolutions, in the embodiment. Through simple appropriate arrangements, it is possible also to obtain cycles of three or five or more revolutions, when the additional cams are more than three.

It is known that the machines in question are required to operate in a completely automatic way in order to form a stocking from the top rim to the heel, to the sole and the toe tip so that it is only necessary subsequently to effect a finish of said stocking.

Appropriate sets of front and rear coaxial cams 44 (Figs. 3 and 6) and 45 (Figs. 3 and 5) respectively, are provided in general in these machines for the execution of these automatic operations. On the other hand, when the improved device according to the invention is also operated, it is necessary to provide for the formation of the rim, heel, sole and the like in an automatic way and in general not with mesh yarn. For this purpose, similarly to what is actuated in the known machines, it is necessary to provide the actuation of means in the devices similar to those denoted by 31—37—38—39 above described, means which allow keeping of the lever 38 (and similarly the lever 40 and the one denoted by 41) in a position with the wheel 37 completely lifted relative to the track 31a, or in a position wherein the wheel 37 is only submitted to the action of a section of the profiles 31b so as to determine only half of the travel or stroke of insertion, and also means to keep the lever 38 always in the position corresponding to the depressions or face of the track 31a. In order to actuate the partial or total lifting of the small wheel 37 from the track 31a, there is a small lever 46 hinged to the structure 30 and provided with a lug 46a designed to intercept the lever 38 so as to limit the angular displacement, to which the thrust of the lever 26 corresponds in the direction of the arrow 47 (Figs. 3 and 4). Said lever 46 is controlled by a flexible cable 48 anchored to the small lever 46 and sliding in a sheath 49 secured to a stirrup 50 (these members are shown in Fig. 4). The cable 48—49 is extended to the rear section of the machine (see Fig. 5), where the sheath 49 is secured to a stirrup 50a and the cable 48 is secured to a rocker or tappet 51 controlled by one of the additional disc cams 45. In this way, according to the profile of said additional cam 45, cooperating with the rocker 51, it is possible that in the zones of radial depression of said disc cam, the cable 48 is paid out so as to allow all the movements of the lever 38, while a partially projecting profile may move the rocker 51 so as to recall the cable 48 and thus move the lever 46 in such a way that the projection 46a of said lever only and partly prevents the movements of the lever 38 and keeps the wheel 37 lifted for a half of its own usual stroke or travel relative to the depression of the track 31a and so that said wheel is only lifted by the effect of the most projecting sections of the profile 31b; the additional cam 45 may also determine a major pull of the cable 48 so as to keep the lever 38 in a position corresponding to the maximum lifting of the small wheel 37.

The wheel 37 can also be moved away from the track 31a so as to be kept lowered relative to said track, whatever the profile may be in correspondence of the wheel. For this purpose, the wheel 37 is mounted on a slidable assembly 37a which can be displaced relative to the lever 38 by the control of a rocker lever 54 pivoted on the lever 38 and controlled in one direction by a rod 55 (Figs. 4 and 6) and in the opposite direction by a suitable counter spring. The rod 55 is controlled by a rocker tappet 56 similar to the one denoted by 51 and co-acting with a disc cam added to those denoted by 44. Through this arrangement, it is possible, by means of the control of said addtional cam 44, to displace the wheel 37 relative to the profile 31a so as to prevent the angular rotation imposed by the profile 31b to the lever 38, and in such a way as to keep the rod 26 completely displaced in the direction of the arrow 47.

Similar arrangements allow similar controls for the engagement of the levers 40 and 41 in a similar operation of the members 46 to 51 and 54—56 on the lever 38.

A circular cam, added to the one denoted by 44 or the one denoted by 45, controls the engagement or disengagement of the usual closure or stitch cam S which may discharge all the needles.

It is possible to form the initial parts of the stocking (rim) and the end parts thereof (heel, foot and tip) through the aid of these controls.

It is known, for example, that the smooth mesh is often effected in correspondence of the foot or sole and the net mesh is effected in correspondence of the rear section of the foot (split).

Therefore in these sections of the stocking working the displacement of the cams is effected so that during the second half turn of the second and fourth revolution or phase above described, the smooth mesh is formed instead of the net mesh. For this purpose, it is sufficient to operate in such a way that during this work the cams 20—21 are not in conditions to move back into the inactivity positions, but rather always remain semi-engaged so as always to lift the jacks provided with a high foot, which are located under the low foot needles, arranged to form the smooth mesh for the sole. Therefore while during the first half turn of the second revolution or phase (Fig. 11) and during the first half turn of the fourth revolution or phase (Fig. 13), the operation of the cams is that above described for the formation of the net mesh, during the second half turn of the second revolution or phase (Fig. 11a) the cam 20 remains partly engaged and thus it also lifts the jacks like the cam 21, and in the second half turn of the fourth revolution or phase the cam 21 remains partly engaged and also lifts the jacks in union with the cam 20. The closure cam S, during the formation of the sole, is set back so as to let the needles be free. The cams 20—21 advance up to the half stroke when the low foot jacks are located in correspondence thereto, while the control members of said cams (such as the one shown in Fig. 4) are preset in order to operate in the abovementioned way; the cam 12 is operated as in the way mentioned for the net mesh.

The other automatic operations for the completion of the stocking may be effected in a per se known way. The closure cam S remains in the usual position practically for the formation of the rim so as to permit discharge of thread from all the needles and the cam 12 is completely moved back so as to remain inactive, the cam 20 remains also set back while the cam 21 remains completely advanced in order to lift the correspondent jacks, effecting a selection which usually is effected—in the machine created for the smooth mesh—by an appropriate stationary cam, which is replaced by the one denoted by 21. The closure cam returns into the operational position for the start of the heel formation when the needles provided with a high foot are raised over the cam, while the additional cams are excluded. The cams 20—21 are moved back at the first motion and at the replacement of the thread for the formation of the tip; the cam 12 at the first motion is advanced so that all the needles are lifted for the discharge of the mesh, and then returns inactive; the closure cam then re-assumes the work position, advancing when the needles are lifted.

In accordance with a possible modification for the purpose of actuating a machine providing for a major number of possibilities for the formation of the net mesh, instead of supplying two single cams for the control of the jacks underlying the needles, there is a provision for a major number of cams for the control of said jacks, each cam being capable of controlling the feet of a corresponding row of feet carried by the jacks.

A certain number of cams—for example superimposed—more particularly may be provided for, each cam being aligned with a row of feet carried by the jacks, the rows of the feet being as many as the cams; in general the adjacent feet of a row belong to jacks spaced from one another by a certain number of jacks equal to the number of the cams, or by a major number of jacks, in accordance with appropriate combinations.

Four jack control cams and four rows of feet in correspondence of the respective cams can be provided, for example, in general the adjacent feet of a same row belonging to one jack on four of them.

The single control cams of the jack's feet are controlled by the same number of circular cams or by cams shaped in another way through independent controls; the single circular cams are controlled by the machine work schedule members so as to have a predetermined succession of needles which do not discharge the mesh, in order to obtain a requested type of mesh yarn, substantially like the net type.

In the particular case of four jack control cams, any sequence may be effected during the lifting of one jack during four revolutions or during eight revolutions, in this last case a smooth mesh revolution or phase is introduced between each revolution wherein one or more needles out of four remain lowered without discharging the mesh.

Figs. 14 to 18 illustrate an embodiment of a machine, wherein there are four jack control cams, whose feet are arranged on four correspondent rows.

The assembly of the devices is substantially similar to the one described in the previous embodiment.

In particular 101 denotes the rotating drum coupled with the cylinder 102 carrying the longitudinal grooves, wherein the needles 103, provided with feet, slide; of said needles, those included along an arc of circumference have a low foot 103a and those included in the other arc of circumference have a high foot 103b. 104 denotes the jacks which may have a different length, but however include the feet arranged on four rows a—b—c—d, low foot jacks corresponding to high foot needles and high foot jacks to low foot needles; among said jacks feet, those belonging to four adjacent jacks have the same height and are arranged each in one of the abovementioned four rows; for example, in the drawing, one is arranged in the row a, a second in the row b, a third in the row c, and the last in the row d; however it is not excluded that other arrangements may be provided, for example the first foot in the row c, the second in the row a, the third in the row b and the fourth in the row d. It is not to be excluded that, for example, two or more feet may be arranged in the row a, two or more in the row b and so on, or two or more feet in a single row or only in some of the four rows.

A block 106 is carried by the base plate 105 and sliding housings for four superimposed cams, 107—108—109—110 respectively, are derived in said block; said cams control the four rows of feet of the jacks, the control being effected through the displacement of cams so as to completely abut or only for a half way or radially retract them outwardly as already described in the first embodiment with a sequence determinable through circular cams. For example, a single needle of the sequence of four or also two of them may discharge thread for each revolution or phase of the net mesh.

The cams 107 to 110 may have a substantially V-shape as illustrated in Fig. 17 and this for the purpose of preserving the feet against breakdowns in the eventuality of a rotation in a direction reversed to the usual rotation of the cylinder 102 and also to be in conditions of working with a reversed rotation.

A cam similar to the one denoted by 111 housed in a block 112 serves to control the feet of the needles in the already described manner.

The cams 107 to 110 are respectively controlled by the two front tracks 113a and 113b of the circular cam 113, by the two front tracks 114a and 114b of the circular cam 114 and by the front track 115a of the circular cam 115. The control occurs through devices completely similar to those already described in the previous embodiment and at least some of which are susceptible of being raised from the track or according to the entire height of the possible travel or for the half height, or also to be excluded from the relative track for the already known purposes. A rocker or tappet cooperates with each circular cam 113, 114, 115.

The controls are transmitted to the cams 107 to 110 through the rods 116—117—118—119 respectively and to the cam 111 through the rod 120. In particular, while the control of the rod 120 is transmitted through a square 121 to the small connecting rod 122 which imparts the radial displacements to the cam 111, the rods 116 to 119 are connected in a jointed manner to four horizontal pins 123, 124, 125 and 126 respectively, linked to two bearings 127 and 128 secured to the plate 105. The rods are connected through lever arms 123a—124a—125a—126a respectively in such a way that the displacements of the rods determine rotations of the pins 123 to 126, besides rotations of the bent ends 123b to 126b of said pins respectively; said bent ends act on the stems 107a to 110a of the cams 107 to 110. The circular cams 113, 114 and 115 are shaped so as to obtain the predetermined desired law of control of the cams 107 to 110 and it is possible to vary said law through their replacement. The cam 115 repeats the cycle for every two revolutions of the cylinder and for this purpose it is driven by a timing shaft of the machine in a known way with a ratio 1 to 2 or 1 to 5. The cams 113 and 114 must each rotate, on the contrary, according to 1 to 8 of the rotational speed of the needles cylinder.

According to Fig. 18 the block 106 is formed by three superimposed sections 106a, 106b, 106c; the first for the stems 109a, 110a of the cams 109 and 110, the second for the cam 108 and the third for the cam 107. The section 106a is secured to the plate 105 and the superimposed sections 106b and 106c are trued by pins 130 and secured by screws 131.

Different control cycles may be used; for example, it is possible to provide that during four revolutions of the net mesh (alternated with the same number of smooth mesh revolutions) successively one needle of the quartet of needles is discharged at every revolution, according to the successions 1, 2, 3, 4, or 1, 4, 2, 3 or 3, 1, 2, 4 or the like.

Three rows of jack feet may be provided for a revolution of smooth mesh and one for the net mesh. Five or also six rows of jack feet may also be provided.

Figure 19:
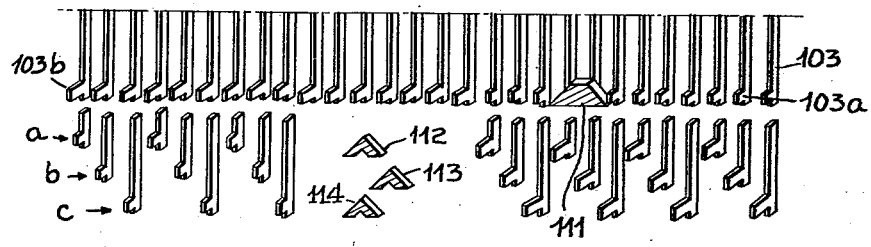

The modified arrangement of needles and relative jacks shown in Fig. 19 differs from the arrangement of Fig. 17 in that three additional cams 112, 113 and 114 for controlling three alignments of jack feet are shown. The feet are arranged in three rows $a$—$b$—$c$. The first, fourth, seventh, tenth, thirteenth, sixteenth and nineteenth are arranged in row $a$. The second, fifth, eighth, eleventh, fourteenth, seventeenth and twentieth are arranged in row $b$. The third, sixth, ninth, twelfth, fifteenth, eighteenth and twenty-first are arranged in row $c$.

Figure 20:
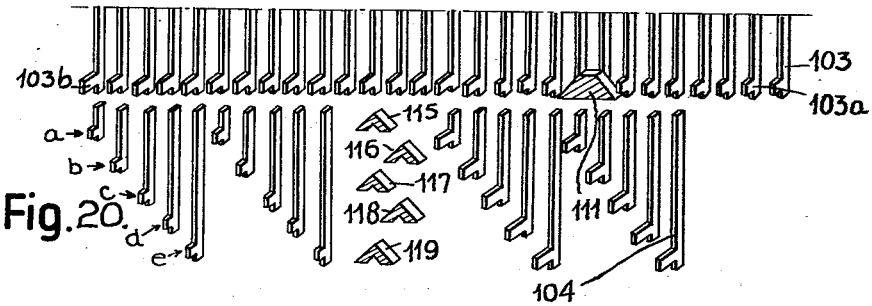

In the modified arrangement shown in Fig. 20, five additional cams 115, 116, 117, 118 and 119 are shown for controlling the jack feet arranged in five rows $a$—$b$—$c$—$d$—$e$. The first, sixth, eleventh, sixteenth are arranged in row $a$. The second, seventh, twelfth and seventeenth are arranged in row $b$. The third, eighth, thirteenth, eighteenth are arranged in row $c$. The fourth, ninth, fourteenth, nineteenth are arranged in row $d$. The fifth, tenth, fifteenth and twentieth are arranged in row $e$.

Figure 21:
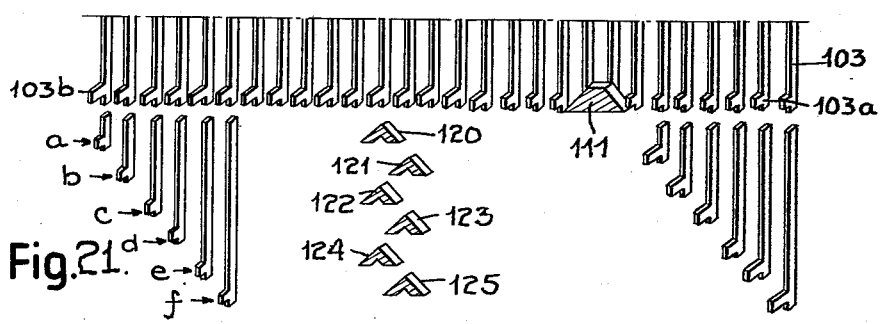

The modification of Fig. 21 shows six additional cams 120, 121, 122, 123, 124 and 125 for controlling the jack feet shown arranged in six rows, $a$—$b$—$c$—$d$—$e$—$f$. The first and seventh are arranged in row $a$; the second and eighth in row $b$; the third and ninth in row $c$; the fourth and tenth in row $d$; the fifth and eleventh in row $e$; and the sixth and twelfth in row $f$.

Figure 22:
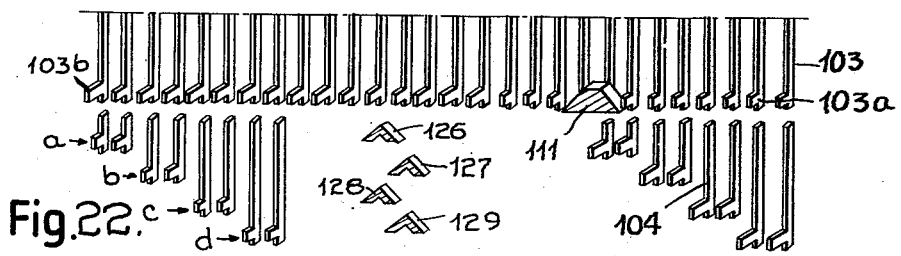

The modified form of Fig. 22 differs from Fig. 17 in showing four additional cams 126, 127, 128 and 129 for controlling jack feet, shown arranged in pairs in four rows $a$—$b$—$c$—$d$. The first, second, ninth and tenth are arranged in row $a$. The third, fourth, eleventh and twelfth are arranged in row $b$. The fifth, sixth, thirteenth and fourteenth are arranged in row $c$. The seventh, eighth, fifteenth and sixteenth are arranged in row $d$.

In all other respects, the arrangements of needles and relative jacks shown in Figs. 19 to 22, inclusive, are the same as the arrangement shown in Fig. 17 and similar reference numerals are used to indicate similar parts.

What I claim is:

1. A circular machine for the manufacture of articles such as stockings, in order to obtain a stitch mesh working in addition to plain mesh working, including: a rotating cylinder having external longitudinal grooves; needles slidably housed in said grooves, each of said needles being provided with a control foot; cam control means for said feet; automatic means controlling the machine for the manufacture of the complete stockings; a jack for each needle and underlying the latter within the corresponding groove, each jack being provided with a foot, the feet of the jacks being recurrently arranged on at least two alignments; said needle feet as well as said jack feet being of at least two heights, in each alignment the feet of equal height being gathered along a circumferential arc, the circumferential arcs being disposed adjacent one another; additional cams arranged on the outside of said cylinder and being radially displaceable, one of said additional cams controlling the needle feet and each of the other additional cams controlling the jack feet of a respective alignment; and means for radially displacing said additional cams, said radially displacing means cyclically acting upon said additional cams to a predeter-determined extent so that each of said additional cams in a first position may act on all the feet of the corresponding alignment, in at least a second partially withdrawn position may act on the higher feet and not on the lower feet of the corresponding alignment, and in at least a third position may be moved away from all the feet.

2. A circular machine for the manufacture of articles such as stockings, in order to obtain a stitch mesh working in addition to plain mesh working, including: a rotating cylinder having external longitudinal grooves; needles slidably housed in said grooves, each of said needles being provided with a control foot; cam control means for said feet; automatic means controlling the machine for the manufacture of the complete stockings; a jack for each needle and underlying the latter within the corresponding groove, each jack being provided with a foot, the feet of the jacks being recurrently arranged on at least two alignments; said needle feet as well as said jack feet being of at least two different heights, in each alignment the feet of equal height being gathered along a circumferential arc, the circumferential arcs being disposed adjacent one another, each jack having a low foot corresponding to a needle having a high foot and each jack having a high foot corresponding to a needle having a low foot; additional cams arranged on the outside of said cylinder and being radially displaceable, one of said additional cams controlling the needle feet and each of the other additional cams controlling the jack feet of a respective alignment; and means for radially displacing said additional cams, said radially displacing means cyclically acting upon said additional cams to a predetermined extent so that each of said additional cams in a first position may act on all the feet of the corresponding alignment, in at least a second partially withdrawn position may act on the higher feet and not on the lower feet of the corresponding alignment, and in at least a third position may be moved away from all the feet.

3. A machine as defined in claim 2, wherein the number of additional cams for the control of the alignments of jack feet is four, every fourth jack's foot being in the same alignment.

4. A machine as defined in claim 3, including replaceable circular cams for each of said additional cams, respectively; a tappet cooperating with each circular cam; drive means for rotating said circular cams at a predetermined speed relative to said needle cylinder; said circular cams being provided with profiles for the lifting of four adjacent jacks each having its foot in a different one of said four jack alignments, said lifting being effected according to a predetermined sequence during four successive revolutions of net mesh so that for each revolution at least one of the four needles corresponding to said four jacks remains lowered without discharging the mesh.

5. A machine as defined in claim 2, including a stationary support for each of said radially displaceable additional cams, said means for radially displacing each of said additional cams including a disc cam; a tappet cooperating with said disc cam; drive means extending between said tappet and said additional cam; means cooperating with said tappet to thereby control the positioning of the additional cam to an inactive position, a partially withdrawn position for control of only the high feet, and a totally engaged position for control of all the feet; a cam provided in the machine for the automatic working of all the parts of an article; one of said disc cams operatively connected to the automatic control means for the exclusion of a conventional stitch cam.

6. A machine as defined in claim 5, wherein said disc cams are shaped to control said additional cams and to determine the discharge of the thread of all the needles during a first revolution, during a second revolution the alternate discharge from one needle and not from the next one in a section of the needles, during a third revolution the discharge of all the needles and during a fourth revolution the alternate discharge from the needles which had not discharged during the second revolution.

7. A machine as defined in claim 5, wherein said disc cams are formed to control said tappets so that the additional cams always engage the needles during an arc for the making of the smooth mesh, leaving the distribution unaltered during the other arc for the making of the net mesh.

8. A machine as defined in claim 5, wherein said disc cams are formed to control said tappets so that the additional cams may be controlled for the making of the net mesh, but may exclude the totally set back position, in order to lift the needles corresponding to high feet jacks for the making of the smooth mesh along the corresponding arc.

9. A machine as defined in claim 2, wherein the number of said other additional cams is at least three, each of said other additional cams controlling the feet of a corresponding alignment of jack feet.

10. A machine as defined in claim 9, wherein jack feet spaced from each other by the number of jacks corresponding to the total number less one of jack alignments belong in the same alignment.

11. A machine as defined in claim 9, wherein at least some alignments of jack feet include the feet of adjacent jacks.

12. A machine as defined in claim 2, wherein said radially displacing means cyclically actuates each of said additional cams so that each of said additional cams is successively positioned to be inactive, subsequently to act on the longer feet only, then to act on all the feet, and finally again to be inactive.

13. A machine as defined in claim 2, wherein the needle feet are arranged in an alignment and the jack feet are arranged alternately on two alignments, the feet of each alignment being of two different heights, one of said additional cams being provided for each of the three alignments.

14. A machine as defined in claim 2, wherein said additional cams for the control of the feet are provided with V-shaped inclined profiles.

References Cited in the file of this patent
UNITED STATES PATENTS

| | | |
|---|---|---|
| 1,536,946 | Sutphen | May 5, 1925 |
| 1,933,281 | Robinson | Oct. 31, 1933 |
| 2,255,693 | Jones | Sept. 9, 1941 |